US012149125B2

(12) United States Patent
Ueda

(10) Patent No.: US 12,149,125 B2
(45) Date of Patent: Nov. 19, 2024

(54) MOTOR

(71) Applicant: Nidec Corporation, Kyoto (JP)

(72) Inventor: Tomoya Ueda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 206 days.

(21) Appl. No.: 17/908,601

(22) PCT Filed: Sep. 14, 2020

(86) PCT No.: PCT/JP2020/034773
§ 371 (c)(1),
(2) Date: Sep. 1, 2022

(87) PCT Pub. No.: WO2021/186767
PCT Pub. Date: Sep. 23, 2021

(65) Prior Publication Data
US 2023/0155432 A1    May 18, 2023

(30) Foreign Application Priority Data

Mar. 18, 2020    (JP) ................................ 2020-048172

(51) Int. Cl.
*H02K 1/276* (2022.01)
(52) U.S. Cl.
CPC ................................ *H02K 1/2766* (2013.01)
(58) Field of Classification Search
CPC .................................................. H02K 1/2766
USPC ...................................................... 310/156.6
See application file for complete search history.

(56) References Cited

U.S. PATENT DOCUMENTS

| | | | | |
|---|---|---|---|---|
| 8,044,548 B2* | 10/2011 | Sakai | ...................... | H02K 21/16 310/156.43 |
| 8,844,119 B2* | 9/2014 | Ha | ........................ | H02K 1/2766 29/598 |
| 9,595,851 B2* | 3/2017 | Hazeyama | ........... | H02K 1/2766 |
| 9,735,631 B2* | 8/2017 | Kayano | ................ | H02K 1/2766 |
| 2002/0180295 A1* | 12/2002 | Kaneda | ................ | H02K 1/2783 310/156.43 |
| 2007/0096579 A1* | 5/2007 | Aydin | ..................... | H02K 1/278 310/156.56 |
| 2010/0225191 A1* | 9/2010 | Hiroshi | ................ | H02K 1/2766 310/156.38 |

(Continued)

OTHER PUBLICATIONS

Official Communication issued in International Patent Application No. PCT/JP2020/034773, mailed on Nov. 2, 2020.

*Primary Examiner* — Alexander Talpalatski
(74) *Attorney, Agent, or Firm* — Keating & Bennett, LLP

(57) ABSTRACT

A motor includes a cylindrical rotor core, and a magnet group including first magnets and second magnets alternately arranged along a circumferential direction of the rotor core. A first magnetic flux line generated in the first magnets extends along a radial direction of the rotor core, and a second magnetic flux line generated in the second magnets is inclined with respect to the first magnetic flux line. The rotor core includes an inner portion located on a radially inner side of the magnet group and an outer portion located on a radially outer side of the magnet group. The outer portion includes a first iron core that covers the first magnet from the radially outer side, and a second iron core that covers at least a portion of the second magnet in the central axis direction of the rotor core from the radially outer side.

8 Claims, 3 Drawing Sheets

(56) References Cited

U.S. PATENT DOCUMENTS

| | | | |
|---|---|---|---|
| 2013/0207488 A1* | 8/2013 | Labbe | H02K 23/58 |
| | | | 310/43 |
| 2014/0084731 A1* | 3/2014 | Iwami | H02K 1/02 |
| | | | 310/156.07 |
| 2015/0076948 A1* | 3/2015 | Katou | H02K 7/11 |
| | | | 310/103 |
| 2015/0270751 A1* | 9/2015 | Cao | H02K 1/2773 |
| | | | 310/156.56 |
| 2015/0357870 A1 | 12/2015 | Hazeyama et al. | |
| 2018/0115205 A1* | 4/2018 | Fujihara | H01F 1/0577 |
| 2020/0161939 A1 | 5/2020 | Takahashi et al. | |
| 2023/0179043 A1* | 6/2023 | Kitao | H02K 1/2766 |
| | | | 310/156.56 |

* cited by examiner

MOTOR

CROSS-REFERENCE TO RELATED APPLICATIONS

This is a U.S. national stage of application No. PCT/JP2020/034773, filed on Sep. 14, 2020, and with priority under 35 U.S.C. § 119(a) and 35 U.S.C. § 365(b) being claimed from Japanese Patent Application No. 2020-048172, filed on Mar. 18, 2020, the entire disclosures of which are hereby incorporated herein by reference.

1. FIELD OF THE INVENTION

The present disclosure relates to a motor.

2. BACKGROUND

A synchronous multiphase AC motor, which is a conventional rotating electrical machine, includes a motor including a cylindrical rotor and a stator disposed concentrically with the rotor inside the rotor. A motor in which a plurality of permanent magnets are arranged along a circumferential direction of an inner peripheral portion of a rotor has been known. The plurality of permanent magnets are configured using a magnet array called a "Halbach array". That is, the plurality of permanent magnets include a first magnet whose magnetization direction is a radial direction and a second magnet whose magnetization direction is a circumferential direction, and the first magnet and the second magnet are alternately arranged along the circumferential direction.

In the motor described above, since magnetic saturation occurs in the magnet holder, there is a problem that a leakage flux is generated, and the power of the motor is reduced by the amount of the leakage flux.

SUMMARY

A motor according to an example embodiment of the present disclosure includes a cylindrical rotor core, and a magnet group including first magnets and second magnets alternately arranged along a circumferential direction of the rotor core. A first magnetic flux line generated in the first magnets extends along a radial direction of the rotor core, and a second magnetic flux line generated in the second magnets is inclined with respect to the first magnetic flux line. The rotor core includes an inner portion located on a radially inner side of the magnet group and an outer portion located on a radially outer side of the magnet group. The outer portion includes a first iron core that covers the first magnet from the radially outer side, and a second iron core that covers at least a portion of the second magnet in the central axis direction of the rotor core from the radially outer side.

The above and other elements, features, steps, characteristics and advantages of the present disclosure will become more apparent from the following detailed description of the example embodiments with reference to the attached drawings.

DETAILED DESCRIPTION

Figure 1:
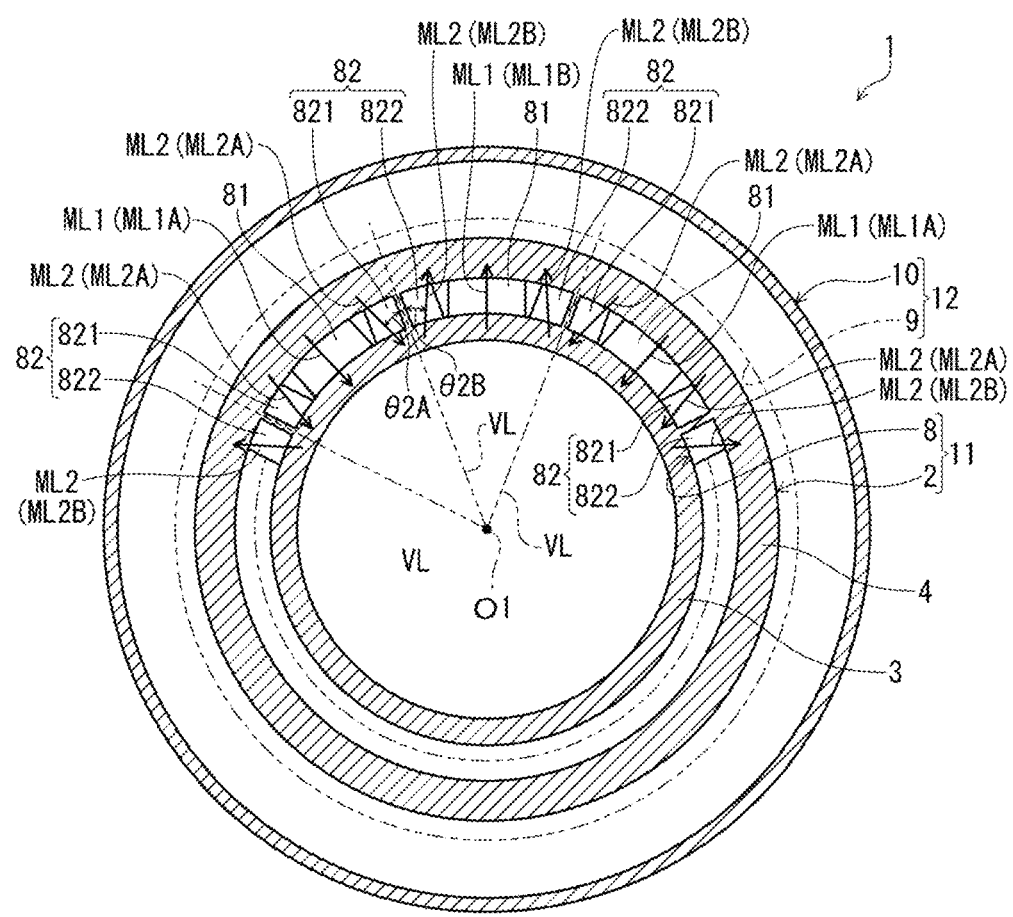
FIG. 1 is a schematic partial cross-sectional view illustrating a motor according to an example embodiment of the present disclosure.
Figure 2:
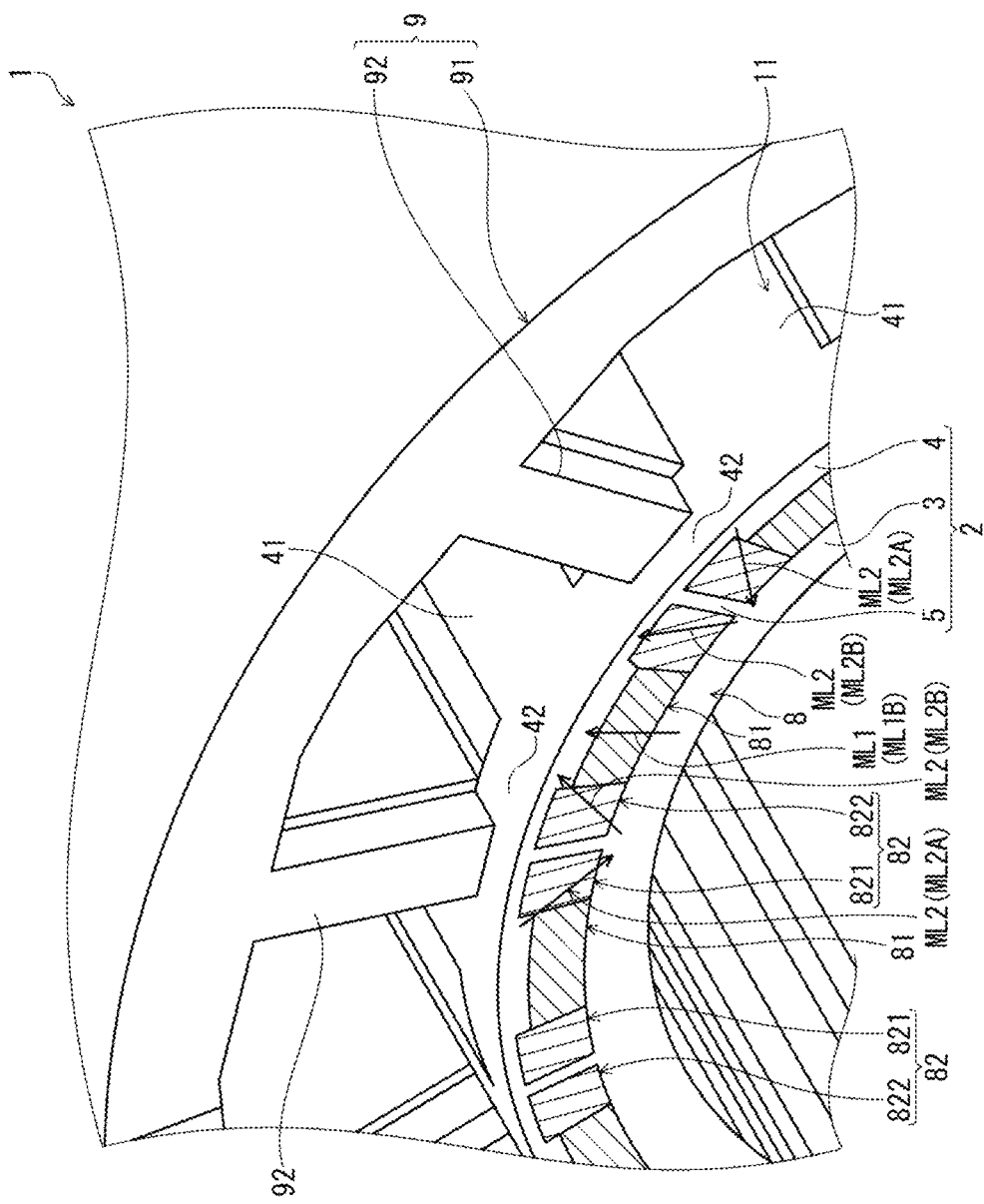
FIG. 2 is an enlarged perspective view of the motor illustrated in FIG. 1.
Figure 3:
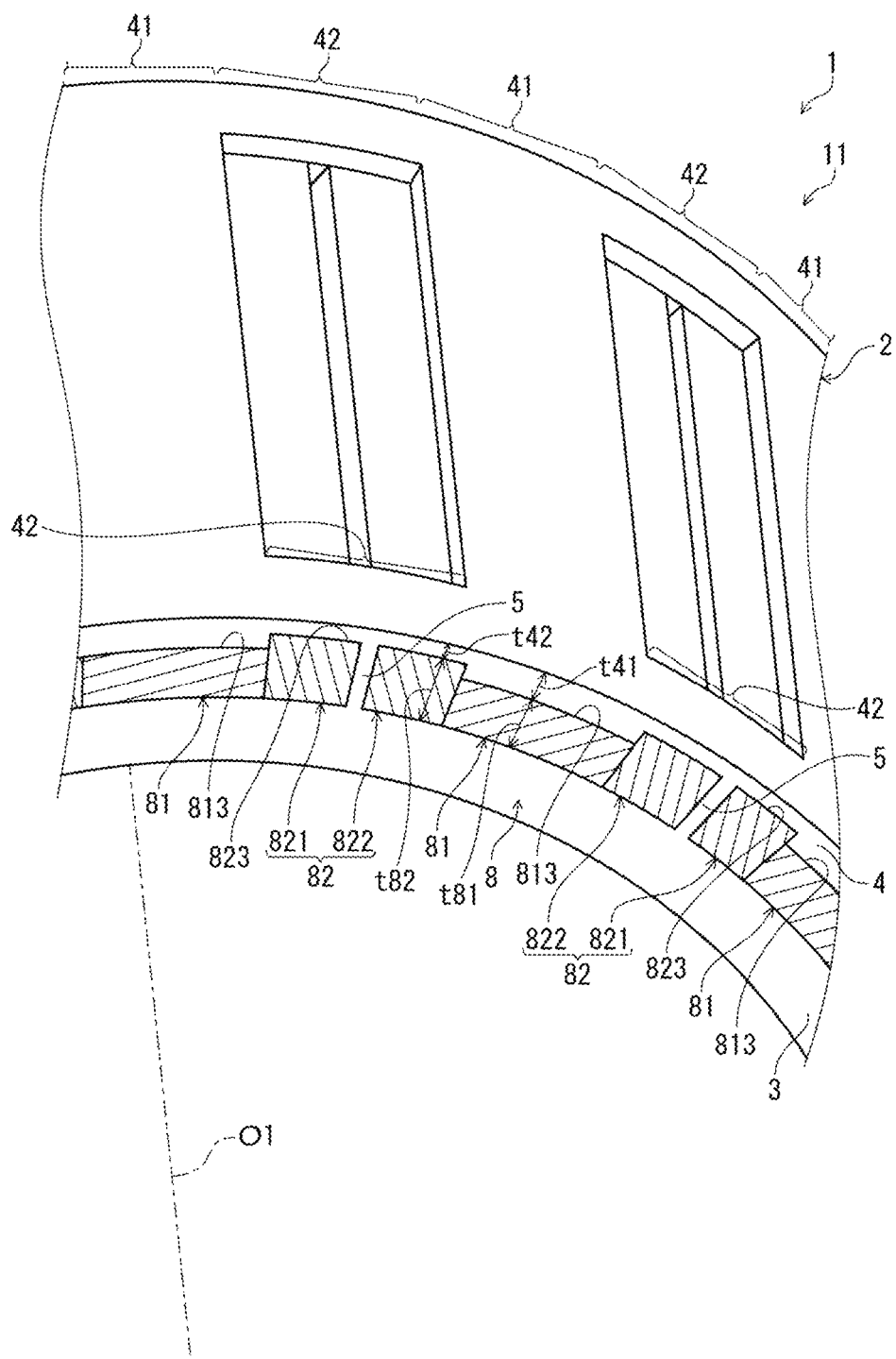
FIG. 3 is an enlarged perspective view of a rotor provided to the motor illustrated in FIG. 1.

With reference to FIGS. 1 to 3, motors according to example embodiments of the present disclosure will be described.

A motor 1 illustrated in FIG. 1 is, for example, a motor used by being mounted on a vehicle such as an automobile. The motor 1 includes a rotor 11 and a stator 9.

As illustrated in FIG. 2, the stator 9 includes a cylindrical core back 91 and a plurality of teeth (protrusions) 92 provided on an inner peripheral portion of the core back 91. The plurality of teeth 92 protrude radially toward the central axis O1 of the motor 1. A coil (not illustrated) having conductivity is wound around each of the teeth 92.

As illustrated in FIG. 1, a rotor 11 is disposed concentrically with the stator 9 inside the stator 9. The rotor 11 is supported so as to be rotatable about the central axis O1 of the motor 1. The rotor 11 includes a rotor core 2 and a magnet group 8.

The rotor core 2 has a cylindrical shape as a whole.

The magnet group 8 includes first magnets 81 and second magnets 82 alternately arranged at intervals along the circumferential direction of the rotor core 2. Both the first magnet 81 and the second magnet 82 are formed of permanent magnets, and the same number of permanent magnets are arranged.

As illustrated in FIGS. 2 and 3, the rotor core 2 includes an inner portion 3 located on a radially inner side (on the central axis O1 side) of the magnet group 8, an outer portion 4 located on a radially outer side of the magnet group 8, and a connecting portion 5 connecting the inner portion 3 and the outer portion 4.

The inner portion 3 has a cylindrical shape.

The outer portion 4 is provided along the circumferential direction of the inner portion 3. The outer portion 4 is disposed radially outside the first magnet 81 and the second magnet 82. As a result, the eddy current loss is reduced.

The connecting portion 5 is provided between the inner portion 3 and the outer portion 4. As a result, when the rotor core 2 is manufactured, the inner portion 3, the outer portion 4, and the connecting portion 5 can be integrally molded using a molding die. As a result, the rotor core 2 can be easily and quickly manufactured. A plurality of the connecting portions 5 are disposed along the circumferential direction of the inner portion 3. As a result, the inner portion 3 and the outer portion 4 can be stably and firmly connected.

The inner portion 3, the outer portion 4, and the connecting portion 5 are not limited to being integrally molded. For example, when the rotor core 2 is manufactured, for example, a T-shaped magnetic body in which a second iron core 42 described later and the connecting portion 5 are integrated may be inserted between the second magnets 82. In this case, it is preferable that the second magnet 82 and the second iron core 42 are fixed with an adhesive or the like.

The constituent material of the rotor core 2 is not particularly limited. The rotor core 2 is made of, for example, a magnetic material, and examples of the constituent material (soft magnetic material) of the magnetic material include electromagnetic steel (silicon steel), carbon steel, structural steel, pure iron, soft iron, and stainless permalloy.

The magnet group 8 is held between the inner portion 3 and the outer portion 4. As described above, the magnet group 8 includes a plurality of first magnets 81 and a plurality of second magnets 82 alternately arranged along the circumferential direction of the rotor core 2. Each of the first magnets 81 and each of the second magnets 82 have an elongated shape along the central axis O1 direction, that is, a bar shape or a plate shape.

As illustrated in FIGS. 1 and 2, a first magnetic flux line ML1 is generated in each of the first magnets 81. Each of the first magnetic flux lines ML1 extends along the radial direction of the rotor core 2. In particular, in the present example embodiment, among the first magnets 81 adjacent to each other in the circumferential direction via the second magnet 82, the first magnetic flux line ML1 of one of the first magnets 81 is a first magnetic flux line ML1A directed to the inner side of the rotor core 2, that is, toward the central axis O1. The first magnetic flux line ML1 of the other first magnet 81 is a first magnetic flux line ML1B directed to the outer side of the rotor core 2, that is, in a direction away from the central axis O1.

In each of the second magnets 82, a second magnetic flux line ML2 is generated. Each of the second magnetic flux lines ML2 is inclined with respect to a virtual line VL (first magnetic flux line ML1) connecting the center of the second magnet 82 and the central axis O1. In particular, in the present example embodiment, the second magnet 82 is divided into two small magnets so that the directions of the second magnetic flux lines ML2 are different. Hereinafter, one of the two small magnets is referred to as a "first divided magnet (first small magnet) 821", and the other small magnet is referred to as a "second divided magnet (second small magnet) 822". A connecting portion 5 is positioned between the first divided magnet 821 and the second divided magnet 822.

The second magnetic flux line ML2 of the first divided magnet (first small magnet) 821 is the second magnetic flux lines ML2A directed toward the inner side of the rotor core 2. The second magnetic flux line ML2 of the second divided magnet 822 is the second magnetic flux lines ML2B directed toward the outer side of the rotor core 2. Both the second magnetic flux line ML2A and the second magnetic flux line ML2B are inclined with respect to the virtual line VL. An inclination angle θ2A of the second magnetic flux line ML2A with respect to the virtual line VL and an inclination angle θ2B of the second magnetic flux line ML2B with respect to the virtual line VL are, for example, preferably larger than 0 degrees and equal to or smaller than 90 degrees, and more preferably, equal to or larger than 25 degrees and equal to or smaller than 65 degrees.

As illustrated in FIG. 3, the outer portion 4 includes a first iron core 41 and a second iron core 42.

The first iron core 41 is disposed facing the first magnet 81. The first iron core 41 has a plate shape along the central axis O1 direction, and covers the entire outer surface (front surface) 813 of the first magnet 81 from the radially outer side.

The second iron core 42 is disposed facing the second magnet 82, that is, both the first divided magnet 821 and the second divided magnet 822. The second iron core 42 has a plate shape along the circumferential direction of the rotor core 2, and covers at least a part of the outer surface (front surface) 823 of the second magnet 82 in the central axis O1 direction (central axis of the rotor core 2) from the radially outer side. In the present example embodiment, two second iron cores 42 are arranged at a distance from each other in the central axis O1 direction per second magnet 82.

With the outer portion 4 having such a configuration, the magnetic flux can be attracted to the first iron core 41 and the second iron core 42 made of the material (magnetic body) having a relatively high magnetic permeability. As a result, the leakage flux is reduced (hereinafter referred to as "leakage flux reduction effect"). The power of the motor 1 can be improved by the leakage flux reducing effect and the direction of each magnetic line described above.

In particular, in the present example embodiment, as described above, two second iron cores 42 are disposed per one second magnet 82, and each second iron core 42 partially covers the outer surface 823 of the second magnet 82. As a result, the leakage flux reduction effect is improved.

A thickness t82 along the radial direction of the second magnet 82 is thicker than a thickness t81 along the radial direction of the first magnet 81. As a result, the thickness t42 of the second iron core 42 can be made thinner than the thickness t41 of the first iron core 41, and the rotor core 2 (outer portion 4) can be a cylindrical body. As a result, the rotor core 2 can rotate stably. In the second iron core 42 having the smaller thickness t42, the magnetic flux remaining in the second iron core 42 can be reduced.

Although the motor of the present disclosure has been described above with reference to the illustrated example embodiment, the present disclosure is not limited thereto, and each unit constituting the motor can be replaced with a unit having any configuration capable of exhibiting similar functions. Further, any component may be added.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
    a rotor core having a cylindrical shape; and
    a magnet group including a first magnet and a second magnet alternately arranged along a circumferential direction of the rotor core; wherein
    a first magnetic flux line generated by the first magnet extends along a radial direction of the rotor core;
    a second magnetic flux line generated by the second magnet is inclined with respect to the first magnetic flux line;
    the rotor core includes an inner portion located on an inner side of the magnet group in a radial direction, and an outer portion located on an outer side of the magnet group in the radial direction;
    the outer portion includes a first iron core that covers the first magnet from an outside in the radial direction, and a second iron core that covers at least a portion of the second magnet in a central axis direction of the rotor core from the outside in the radial direction; and
    a plurality of the second iron cores are spaced apart at a distance from each other in the central axis direction.

2. The motor according to claim 1, wherein a total thickness of the second magnet along the radial direction is thicker than a total thickness of the first magnet along the radial direction.

3. The motor according to claim 2, wherein a total thickness of the second iron core along the radial direction is thinner than a total thickness of the first iron core along the radial direction.

4. The motor according to claim 1, wherein at least a portion of the second iron core is made of a magnetic material.

5. The motor according to claim 1, wherein the rotor core includes a connecting portion that connects the inner portion and the outer portion.

6. The motor according to claim 1, wherein
a plurality of the first magnets is provided; and
the first magnetic flux line of one of the first magnets adjacent to each other in the circumferential direction via the second magnet is directed to an inside of the rotor core, and the first magnetic flux line of another one of the first magnets is directed to an outside of the rotor core.

7. The motor according to claim 1, wherein the second magnet is divided into two second magnets so that directions of the second magnetic flux lines are different.

8. The motor according to claim 7, wherein one of the second magnetic flux lines of the two divided second magnets is directed to an inside of the rotor core, and another one of the second magnetic flux lines is directed to an outside of the rotor core.

\* \* \* \* \*